Aug. 18, 1936.     J. F. MARTIN     2,051,265
CARRIER
Filed Sept. 16, 1935
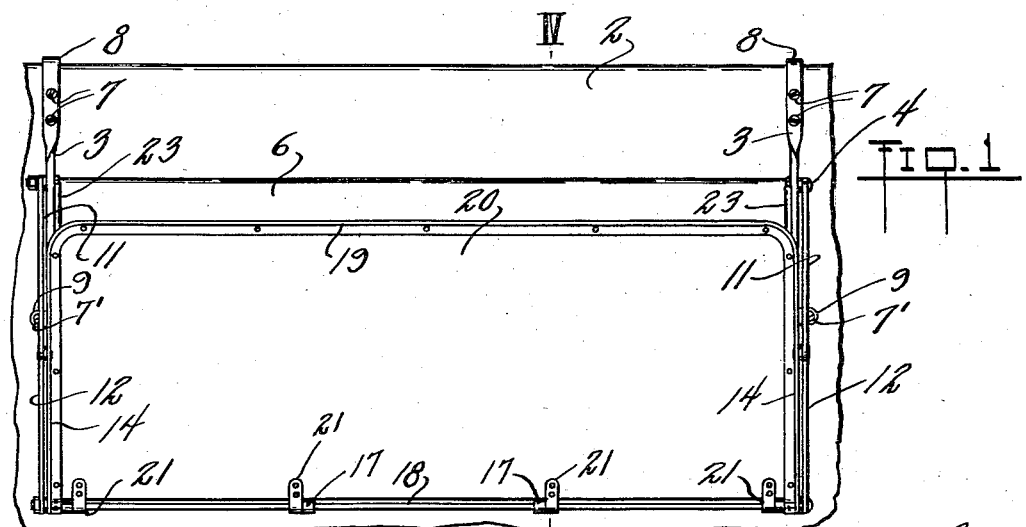
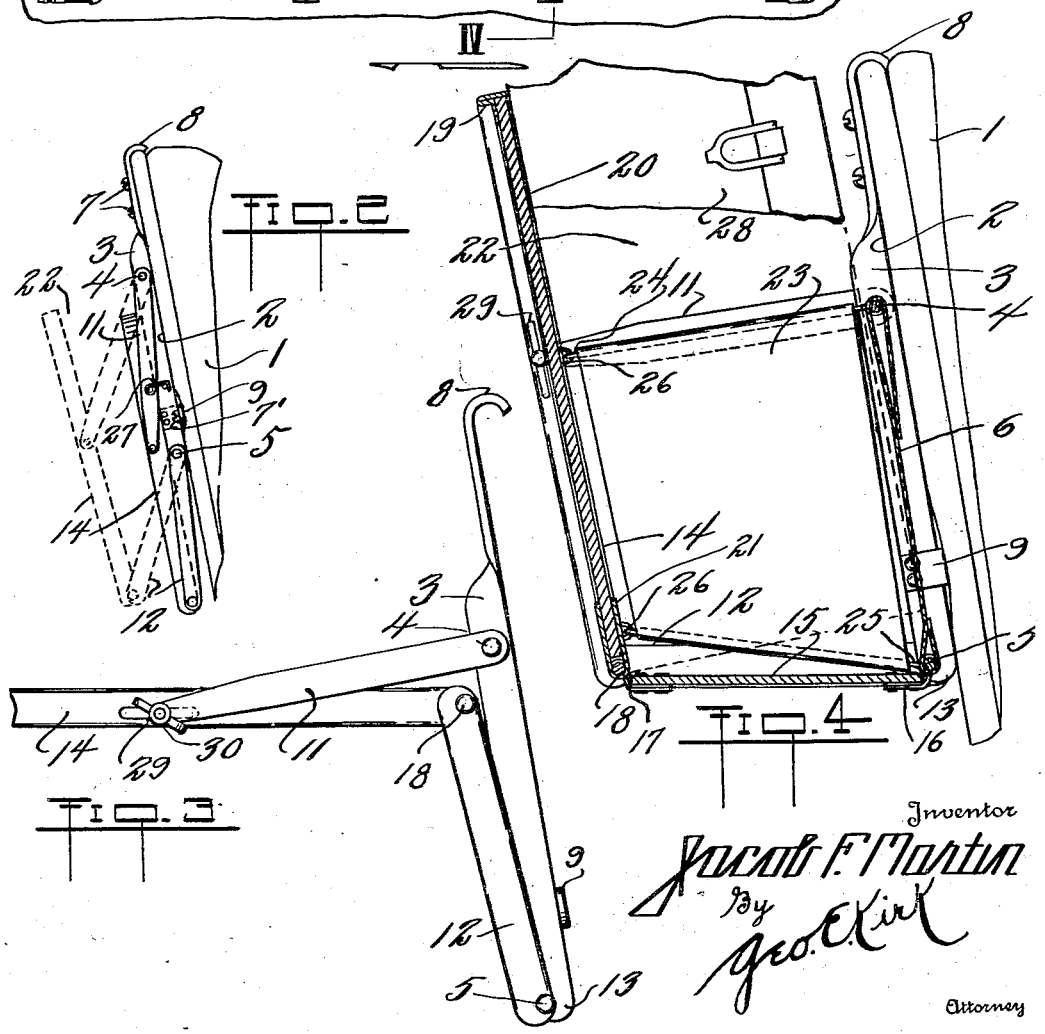
Inventor
Jacob F. Martin
By Geo. E. Kirk
Attorney Patented Aug. 18, 1936

2,051,265

UNITED STATES PATENT OFFICE 2,051,265

CARRIER

Jacob F. Martin, Bellevue, Ohio

Application September 16, 1935, Serial No. 40,759

4 Claims. (Cl. 224—29)

This invention relates to carriers of pocket and table types.

This invention has utility when incorporated in suspended collapsible devices in their out-of-use positions and distensible to provide receivers, and further openable to form a ledge or platform.

Referring to the drawing:

Fig. 1 is a view of an embodiment of the invention in collapsed position suspended from the back of the front seat of an automobile;

Fig. 2 is a fragmentary end elevation from the right of Fig. 1, with dotted line showing of the device partially distended;

Fig. 3 is a view similar to Fig. 2, with the device opened to provide a table; and Fig. 4 is a section on the line IV—IV, Fig. 1, showing the device in pocket forming or carrier distension.

Motor vehicle is shown with seat back 1 having rigid rear section 2 with clearance rearwardly therefrom and above the vehicle floor. Accordingly, it is desirable to mount the device of this disclosure upon the rear of automobile front seats, preferably clear of interference with robe or foot rails. To this end bars 3 connected by rods 4, 5, provide the support or main mounting member. Fabric 6 between the bars and rods provides a shield or cover for the upholstery on the seat back, against being marred by the assembly or use of the device.

The supporting member takes the load of the carrier or device, which may be by means of screws 7 through the upper portions of the bars 3 and into the seat rear section 2. Such assembly is desirable with top hooks 8 in anchoring gripping contact with the section 2. Due to the usual angle or rearward inclination for automobile seat backs, supplemental anchoring strength may be had by brackets 9 lower down upon the bars 3, with screws 7' therethrough into the section 2. There is thus a firm holding of the support against the seat back.

From the rod 4 at each bar 3 there is intermediate link 11. From the rod 5 at each bar 3 there is link 12 thus located near lower termini 13 of the bars 3. These links 11, 12, have spaced pivotal connection at their free ends with opposing side member portions 14. Bottom 15 is carried by and between the lower shorter links 12 and has pivotal connections 16 to the rod 5 and pivotal connections 17 to rod 18 providing the pivotal connection between the free ends of the links 12. Remote from the rod 18, rib 19 extends between the portions 14 in completing a U-shaped binding frame for opposing side or member 20 having pivotal connections 21 with the rod 18. These pivotal connections for the bottom and side provide form-holding reinforcement for the carrier when partially distended to provide a pocket.

With the links 11 slightly longer than the links 12, space 22 between the members is wider at the top than at the bottom. There is a range of approximately parallel movement in such opening out for an automatically adjustable collapsing pocket which may have ends 23 of fabric mounted by extensible flexible members 24, 25, extending from rods 4, 5, to eyes 26 on the side 20.

Catch 27 between a link 11 and a bar 3 may serve to hold the carrier collapsed into out-of-use position. Upon release of the catch, the opposing side may be pulled away from the support and there is thus opened up the pocket 22 to receive and adjust to suit case 28 or other article of luggage. Such luggage as against the bottom 15, causes such bottom to incline from the supporting bars 3 and thus automatically reduces the expansion of the pocket. Accordingly the carrier is thus at all times in its minimum dimension for the load it is carrying.

By swinging the free ends of the links 12 past the pocket maximum width and upward toward the bars 3, the pocket portion again collapses and the opposing member 20 approaches horizontal or table-forming position as a ledge with the rod 18 against or toward the bars 3 just below the rod 4 as an inner region of support, while the links 11 extend slightly downwardly therefrom for mid-table stability. The links and members spaced therebetween approximate a parallelogram.

Slots 29 and wingnuts 30 for the assembly of the links 11 with the table portions 14, permit of adjustment for table-leveling as may be desired, especially for different makes of cars, as to adapt to seat back inclination acceptable to one using the table or ledge as a support or carrier.

There is thus quite a range of flexibility in adaptation and use for the variable pocket and adjustable ledge collapsible device, with features of strength and utility throughout the range of adjustments.

This range of flexibility for mounting in use may even extend to the mounting itself as adapted to receive the collapsed device similarly to the form of seat back adapted to receive a folding seat.

What is claimed and it is desired to secure by United States Letters Patent is:

1. A carrier embodying opposite ends, each including a substantially vertically extending supporting member, an intermediate link therefrom, a terminal link therefrom, and an opposing side member pivotally connected to the free ends of said links, said terminal link being swingable in an arc toward the intermediate link adjacent the supporting member and bringing the opposing member into position substantially at right angles to the supporting member, with one end of said opposing member substantially abutting said supporting member so that the opposing member provides a level deck.

2. A carrier embodying opposite ends, each including a substantially vertically extending supporting member, an intermediate link therefrom, a terminal link therefrom, and an opposing rigid flat side member pivotally connected to the free ends of said links, said terminal link being swingable from downwardly of the supporting member to outwardly therefrom in providing a pocket of greater capacity in the spacing of the opposing member from the supporting member as the intermediate link moves upwardly toward horizontal position, whereby the extent of opening is determined by the bulk of the load.

3. A carrier embodying opposite ends, each including a substantially vertically extending supporting member, an intermediate link therefrom, a terminal link therefrom, and an opposing side member pivotally connected to the free ends of said links, said side member being positioned by swinging the free end of the terminal link upward toward the supporting member to locate the side member to extend outwardly from the supporting member and approximately horizontal, and said intermediate link providing supplemental holding for the side member.

4. A carrier embodying opposite ends, each including a substantially vertically extending supporting member, an intermediate link therefrom, a terminal link therefrom, and an opposing side member pivotally connected to the free ends of said links, said side member being positioned by swinging the free end of the terminal link upward toward the supporting member to locate the side member to extend outwardly from the supporting member and approximately horizontal, said intermediate link providing supplemental holding for the side member, and means for adjusting connection of the intermediate link with the side member to adjust the side member as a table.

JACOB F. MARTIN.